US006967933B2

(12) United States Patent
Chapuran et al.

(10) Patent No.: US 6,967,933 B2
(45) Date of Patent: Nov. 22, 2005

(54) PROCESSING MULTIMEDIA CALLS IN A PACKET-BASED NETWORK

(75) Inventors: Thomas Chapuran, Hillsborough, NJ (US); Seshadri Mohan, Basking Ridge, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 898 days.

(21) Appl. No.: 09/904,069

(22) Filed: Jul. 12, 2001

(65) Prior Publication Data

US 2003/0012150 A1    Jan. 16, 2003

(51) Int. Cl.[7] .............................................. H04Q 11/00
(52) U.S. Cl. ..................................... 370/271; 370/256
(58) Field of Search ............................... 370/259, 260, 370/271, 352, 389; 709/327, 330

(56) References Cited

U.S. PATENT DOCUMENTS

| | | | | |
|---|---|---|---|---|
| 5,473,680 A | | 12/1995 | Porter ......................... | 379/201 |
| 5,717,859 A | | 2/1998 | Yunoki .................. | 395/200.12 |
| 5,812,533 A | | 9/1998 | Cox et al. .................... | 370/259 |
| 6,031,904 A | | 2/2000 | An et al. ..................... | 379/201 |
| 6,181,703 B1 | * | 1/2001 | Christie et al. ............. | 370/410 |
| 6,185,565 B1 | | 2/2001 | Meubus et al. ............... | 707/10 |
| 6,226,373 B1 | * | 5/2001 | Zhu et al. .............. | 379/207.02 |
| 6,363,424 B1 | * | 3/2002 | Douglas et al. ............. | 709/224 |
| 6,470,010 B1 | * | 10/2002 | Szviatovszki et al. ...... | 370/356 |

FOREIGN PATENT DOCUMENTS

WO    WO 00/35157 A    6/2000

OTHER PUBLICATIONS

Bouabid El Quahidi et al, "Extending the Internet with the Intelligent Network Capabilities", Universal Multiservice Networks, 1st European Conference on ECUMN 2000, Oct. 2-4, 2000, Piscataway, New Jersey, IEEE, pp. 80-88.

V. Gurbani, et al., "SIP Enabled IN Services-An Implementation Report", Internet Engineering Task Force (IETF) http://www.letf.org/internet-drafts/draft-gurbani-iptel-sip-in-imp-00.txt, May 30, 2000, pp. 1-10.

V. Gurbani, et al., "Accessing IN Services from SIP Networks", Internet Engineering Task Force (IETF) http://www.letf.org/Internet-drafts/draft-gurbani-iptel-sip-in-imp-02.txt, May 5, 2000, pp. 1-16.

* cited by examiner

Primary Examiner—Duc Ho
Assistant Examiner—Thien D. Tran
(74) Attorney, Agent, or Firm—Joseph Giordano; James W. Falk (57) ABSTRACT

Processing of multimedia calls in a packet-based network builds on existing call model processing by maintaining the use of the basic call state models to control the overall two-party call and the use of connection views to associate multiple two-party calls and provide access to advanced supplementary services. Through the use of a multimedia view processor, the system separates multimedia connection handling from call handling. The basic call models are extended to support new messages and enhanced messages for creating, modifying, and deleting multimedia view objects and communicating modifications to the media streams between call state model processors and protocol specific processors.

31 Claims, 10 Drawing Sheets

PROCESSING MULTIMEDIA CALLS IN A PACKET-BASED NETWORK

FIELD OF THE INVENTION

This invention relates to processing multimedia calls in a packet-based network.

BACKGROUND

Users are increasingly seeking enhanced features and services beyond traditional voice telephony from their communications providers. Packet-based communications networks provide the framework to offer flexible multimedia services to these end-user customers. Unlike traditional telephony networks in which call and connection processing and service logic are primarily located in narrowband switches, packet-based communications networks distribute call and connection processing intelligence among various network components. This distribution of intelligence adds flexibility and increases the potential for the network to support a greater variety of services and protocols in the future.

In order to leverage the advantages offered by existing technology, initial implementations of voice call processing in packet-based networks are often based on traditional advanced intelligent network (AIN) call models. Because of this reliance on traditional narrowband telephony call models, service capabilities in packet-based networks are constrained by limitations of the current call model. As a result, service providers are seeking enhancements to the call model that will allow packet-based networks to support flexible multimedia communications without requiring major modifications or additions to the network infrastructure or operations.

Figure 1:
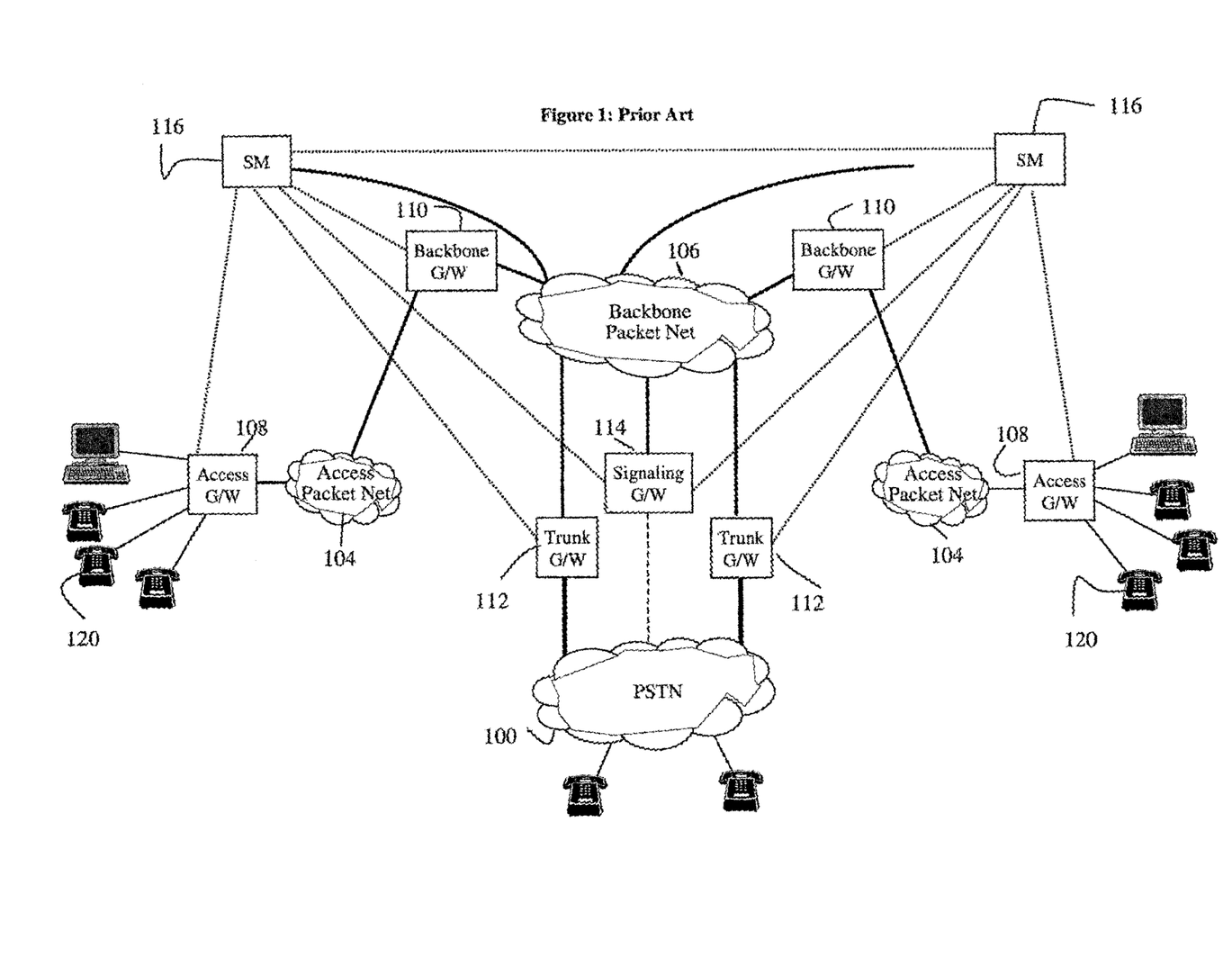
FIG. 1 is a network diagram illustrating a typical packet-based network.

A generalized local service provider packet-based communication architecture is shown in FIG. 1. It consists of two sub networks, a public switched telephone network (PSTN) 100 and a packet network, which includes access networks 104, and a backbone network 106. The access packet network 104 physically connects subscribers 120 to the local service provider network through an access gateway 108. On the customer side, the access network 104 terminates on the customer premises device, which is called here the access gateway 108.

The packet based backbone network 106 is optimized for efficiently transmitting large amounts of data and typically utilizes IP, ATM and/or SONET technologies. The access networks 104 are connected to the backbone network 106 via backbone gateways 110 that mediate between transport technologies utilized in the two networks. Calls spanning the packet network and PSTN network, such as calls originating from access gateways 108 and terminating on the PSTN or vice versa, are routed through trunk gateways 112. A signaling gateway 114 is responsible for sending and receiving signaling information to and from the PSTN (e.g., signaling system 7 packets) and routing that information to the appropriate network elements in the packet network. The signaling gateway can be a separate component or can be integrated into a service manager 116.

A packet network has its own control infrastructure. Typically, network elements are designated to support service, session and connection signaling. In this document, these elements are called service managers 116 (SMs) but these elements are also called media gateway controllers, call agents, softswitches, gatekeepers, and signaling agents. The SM 116 communicates with the access, trunk and signaling gateways across a packet network. The SM 116 may also communicate directly with intelligent end-user equipment capable of signaling, such as a PC, to allow for a richer set of service features than those supported by traditional telephones.

Figure 2:
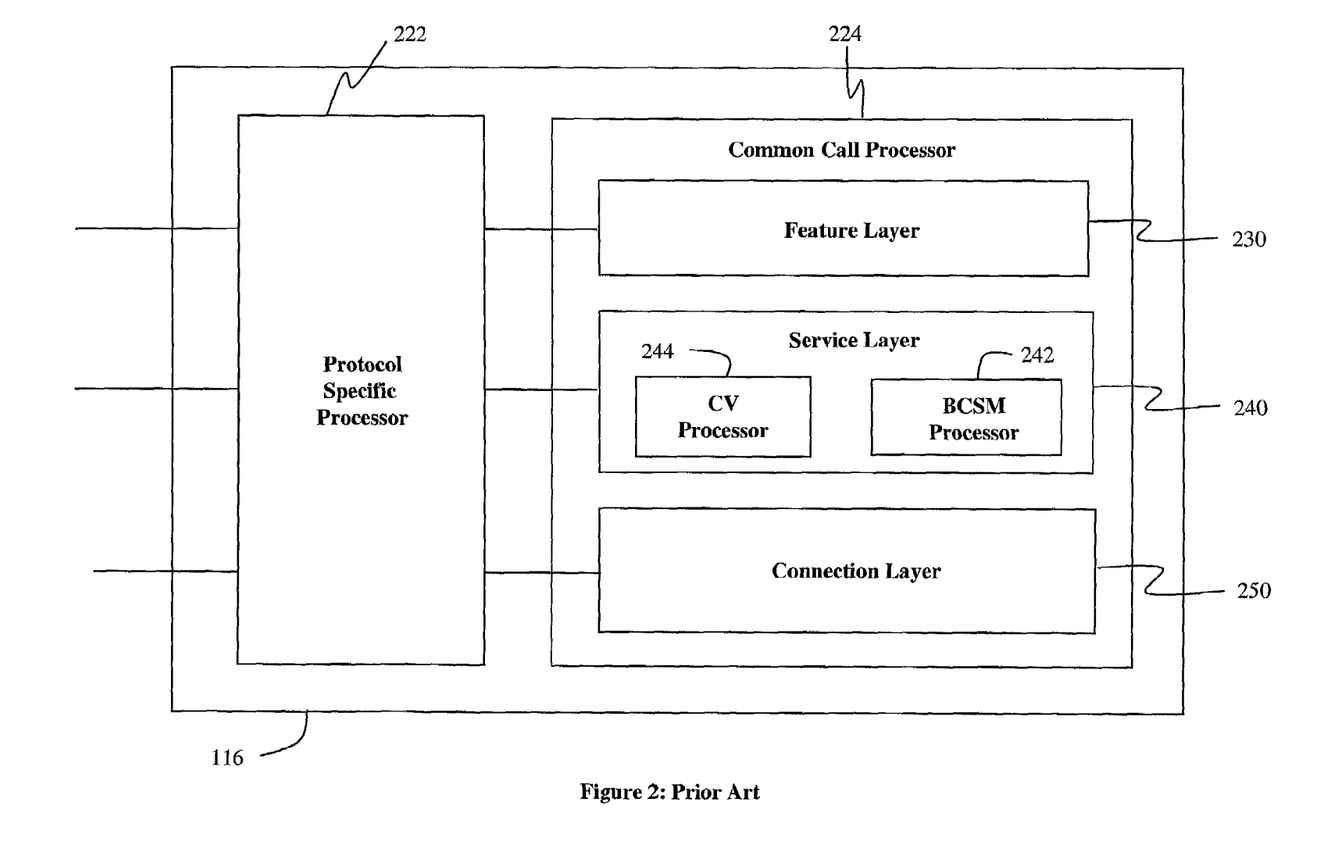
FIG. 2 depicts a typical service manager for the network of FIG. 1.

FIG. 2 illustrates a typical architecture for a SM 116. The SM 116 consists of a protocol specific processor 222 for handling functions specific to a particular set of communications protocols and a common call processor 224 for handling functions that are independent of specific protocols. The common call processor 224 may be represented as consisting of three layers: a feature layer 230, a service layer 240, and a connection layer 250. However, a common call processor 224 may also be represented as having a fewer or greater number of layers. The layers represent a logical mapping of functionality within the common call processor and may vary depending on the implementation.

The feature layer 230 supports functionality for vertical services such as call waiting and local number portability. The service layer 240 accomplishes common call processing functions by initiating, maintaining, and terminating basic call state models and other functions needed to process a basic call. Call processing at the service layer is handled by the basic call state model processor 242 and the connection model processor (e.g., connection view processor 244). The connection management layer 250 is responsible for initiating, maintaining and terminating connectivity requests.

The SM 116 typically applies the AIN basic call state models (BCSMs) developed for narrowband PSTN telephony services for packet based communications. The AIN call model consists of originating and terminating half-call models. The originating basic call state model provides processing in response to a call origination request and controls the establishment of the originating portion of the call. The terminating basic call state model provides processing for the intended recipient of the call and controls the establishment of the terminating call portion.

Figure 3:
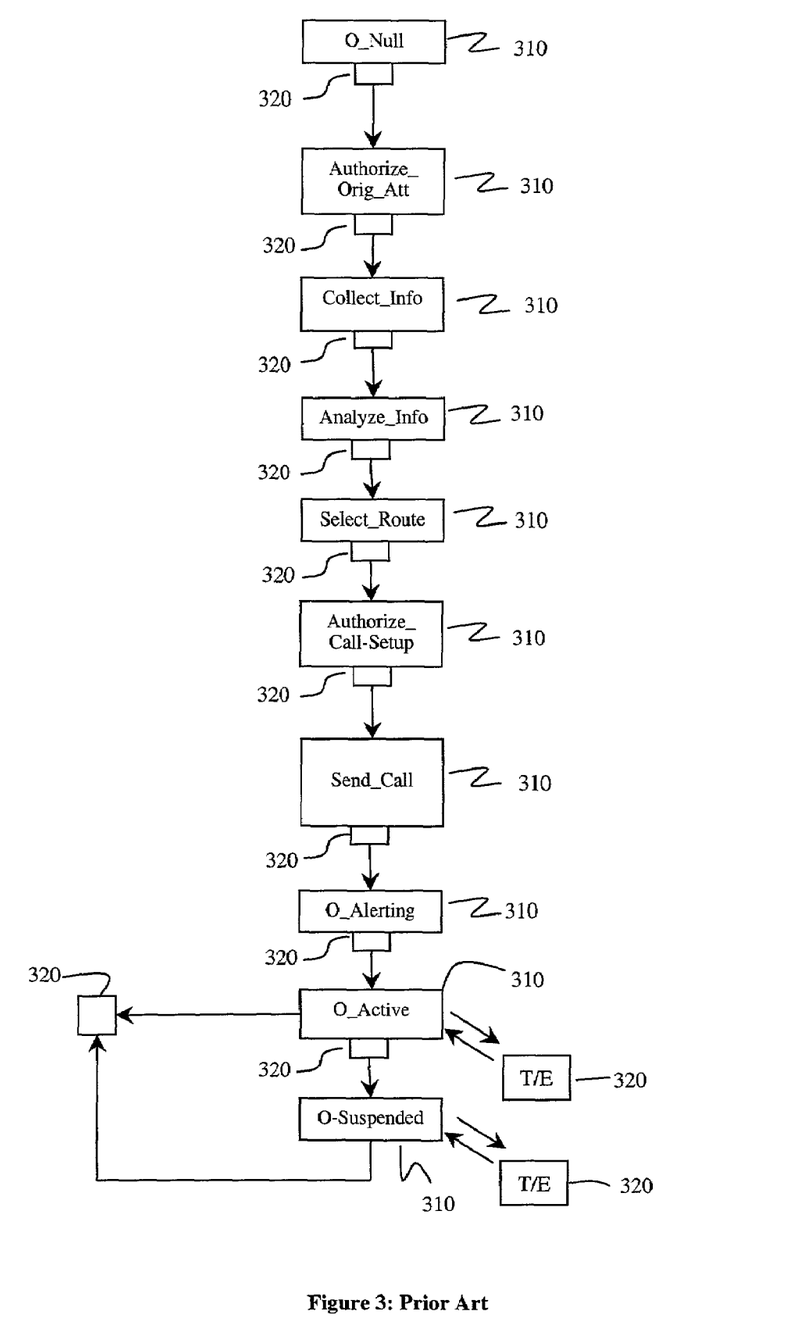
FIG. 3 is a typical AIN originating call model.

FIG. 3 illustrates an example of the AIN originating basic call model. Call processing considered essential to establish, maintain, and clear a two-party call is represented by points in call (PICs) 310. Detection points 320 identify when subsequent call processing can be influenced by AIN service logic.

The recent addition of call party handling (CPH) provides AIN with the ability to manage stable calls with two or more parties. CPH is accomplished through the use of an object-oriented connection view (CV) processor 244. The CV 244 provides a view of a connection configuration, the relationship among legs in a connection configuration, and the status of each leg in terms of a BCSM. In general, CPH capabilities give AIN the ability to detect user requests for mid-call service (e.g., flash hook), to provide service logic in the CV processor 244 with a view of the call and connections, to receive instructions from service logic on how to handle the request, and to modify call processing and connectivity objects.

Figure 4:
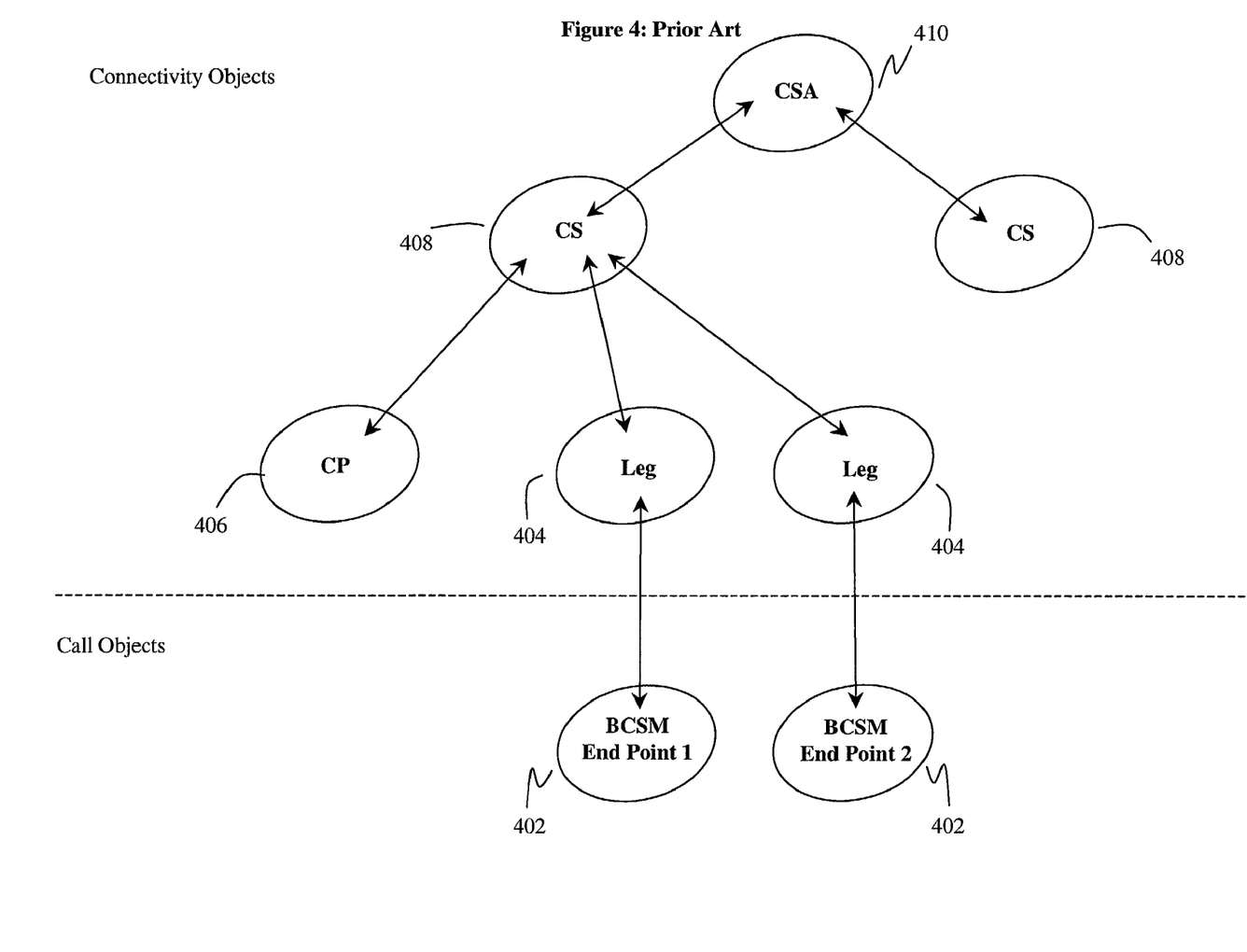
FIG. 4 is a diagram illustrating the relationships between typical connection view objects.

Call processing and connectivity are described by a set of CV objects. The attributes related to these objects are stored in the CV processor 244 for the duration of an AIN session. FIG. 4 illustrates the relationships between CV objects. A call segment association (CSA) 410 contains one or more call segments (CSs) 408. Each CS 408 contains a single connection point (CP) 406 and any connected legs 404. An originating or terminating BCSM 402 is associated with a leg to indicate its state.

A leg 404 represents a communication path towards an end user. A controlling leg receives access signaling directly, while a passive leg receives an indication of access signaling from the other half call. In a CS 408, only one leg, the controlling leg, is directed towards the originating or terminating access. One or more passive legs are directed toward the other half call. Each leg has an associated status value of joined, shared, pending, or surrogate.

The connectivity context in CV reflects the state of a CS or pair of CSs and includes the set of legs in the CSs and the relationship of each leg to a CP. The call processing context reflects the state of the BCSMs 402 related to the CSs 408. For example, in a basic two-party call setup, the CS contains a leg towards the calling party that is in the "joined" state and a leg towards the called party in the "pending" state. Once the call is established, the leg in the pending state enters the joined state. Because a pair of CSs 408 may be associated with a CSA 410, three-way calling or call hold features can be modeled.

The AIN approach has numerous strengths that make it particularly attractive for providing communications services in a packet network. The basic call model and AIN architecture are well understood and provide a fundamental level of compatibility with the existing PSTN infrastructure. The user interfaces, such as analog phone signaling (e.g., off-hook, switch hook flash, DTMF service codes) or ISDN signaling are standardized and in widespread use.

However, the AIN call model was strongly shaped by the major characteristics of narrowband telephony and the equipment (i.e., narrowband switches and conventional phones) which it was developed to support. Traditional restrictions to a single type of media stream and a single active connection per line meant that calls and connections did not have to be cleanly distinguished. A simple two-party point-to-point call/connection was adopted as the fundamental building block for more complicated services such as 3-way calling. This lack of clean separation between call control and connection control limits the applicability of the AIN call model to advanced broadband services. Although such separation is not needed for conventional voice calls, or International Telecommunication Union—Telecommunications Sector (ITU-T) H.323 or Internet Engineering Task Force (IETF) simple Internet protocol (SIP) voice-only calls, it is required for flexible multimedia calls. Such calls utilize multimedia end-user terminals (including multimedia PCs and conferencing systems), which typically have two or more connections (media streams) in a single call, and allow individual connections to be established, modified or released in mid-call.

While Call Party Handling (CPH) provides some level of call and connection separation in the way it models connection view states and maintains call processing and connectivity contexts, the existing AIN call model and architecture framework are not adequate to handle flexible multimedia services efficiently and effectively. Therefore, new approaches to call processing are required to provide support for multimedia services, building on the embedded base of AIN deployed in both the traditional PSTN and packet based communications networks.

SUMMARY

Our invention builds on existing basic call state model (BCSM) processing to provide a flexible method and system for processing multimedia calls in a packet-based network. In our invention, we maintain the use of the BCSM to control the overall two-party call and the use of a connection view (CV) to associate multiple two-party calls and provide access to advanced supplementary services. However, we define a new functionality, called multimedia view, which associates multiple media streams with a two-party call (or call leg) and provides for control of the media streams during the call. Through this innovative functionality, our invention separates multimedia connection handling from call handling, thus overcoming the limitations of the existing architectures discussed above.

Our invention provides an enhanced service manager element that includes a protocol specific processor and a common call processor. The common call processor builds on existing architectures and includes a processor for executing feature functionality, a processor for executing basic call processing functions, and a processor executing connection management functions. The basic call processor further includes an enhanced connection view processor for associating multimedia view objects with connection view objects and an enhanced basic call state model processor for supporting new processing related to multimedia view functionality. The connection management processor includes a new element, the multimedia view processor, for handling multimedia view objects.

In multimedia sessions, media streams may be created, modified, or deleted at various points during the session. Our invention adds three new messages (create_MMV, modify_MMV, and delete_MMV), the corresponding acknowledgement messages, and the associated processing to support these messages to both the originating and terminating BCSMs to handle these attributes of multimedia sessions. In addition, our invention adds two new messages (modify_streams and modify_reply) for communicating modifications to the media streams between call state model processors and between call state model processors and protocol specific processors.

In a first mode of operation of our invention, a multimedia view object associated with the originating party is created in response to a call origination. After invoking terminating basic call state model processing, a multimedia view object associated with the terminating party is created for the call. The multimedia view objects associated with the originating and the terminating party can be modified at various points in the call when updates to media stream information (e.g., media channel selection by the terminating party, addition or termination of media streams) are initiated by either party or through service manager processing. When the call is released, the multimedia view objects associated with each party are deleted along with any associated resources (e.g., ports for media streams).

In a second mode of operation of our invention, multimedia view objects can be updated during a stable multimedia call when either the originating or terminating party initiates a media stream modification. Modifications to media streams can be communicated through call signaling from the end user or through connection-control or bearer control signaling. In addition, the modifications can be extracted from call signaling messages generated by the end user and communicated via a different signaling method.

DETAILED DESCRIPTION OF PREFERRED EMBODIMENTS

Figure 5:
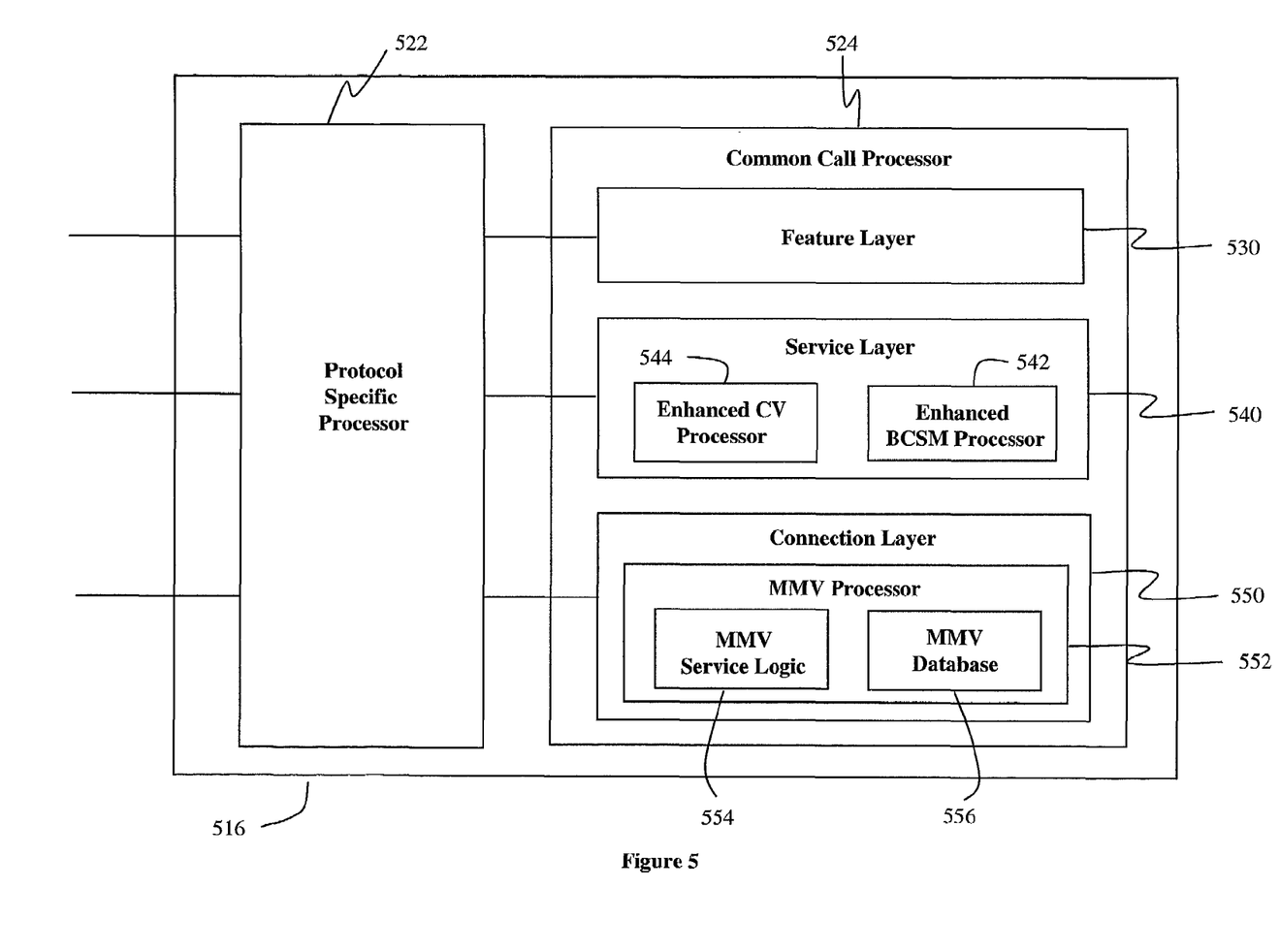
FIG. 5 depicts an illustrative service manager in accordance with our invention.

FIG. 5 illustrates a functional block diagram of a service manager (SM) 516, in accordance with our invention. SM 516 includes a protocol specific processor 522 and a common call processor 524. The protocol specific processor 522 provides connectivity between external sources such as access gateways and end user terminals and the processing capabilities of the common call processor 524. The functionality invoked by the protocol specific processor 522 depends on the protocol being used for communication between the external source and the SM 516 (e.g., H.323 or SIP).

The common call processor 524 consists of three functional layers: the feature layer 530, the service layer 540, and the connection layer 550. These layers represent a logical mapping of functionality within the common call processor. In alternate embodiments of our invention, the functionality represented by these layers may be implemented in a variety of different architectures without impacting the invention.

The service layer 540 in an illustrative embodiment of our invention includes an enhanced AIN basic call state model (BCSM) processor 542 and an enhanced connection view processor 544 for call party handling. In alternate embodiments of our invention, the enhanced AIN basic call state models may be replaced by other basic call state models such as the ITU-T BCSMs. The connection management layer 550 is responsible for initiating, maintaining and terminating connectivity requests to support services. Further, in accordance with an aspect of our invention, the connection management layer 550 includes a multimedia view (MMV) processor 552. The MMV processor 552 handles media stream requests that are received and processed by the protocol specific processor 522.

For example, H.323 or SIP could be used for communications between an intelligent multimedia terminal and the SM 516. H.323 is an ITU-T recommendation that specifies protocols and procedures that provide multimedia communication services such as real time audio, video and data communications over packet networks. SIP is an IETF standard for an application layer designed to support multimedia multicast or point-to-point connections in an IP environment. If the H.323 protocol suite is used, a media stream control channel may be established at the connection level through the protocol specific processor using connection control protocol and procedures (H.245). Media stream control may also be accomplished by tunneling of H.245 messages within ITU-T Integrated Services Digital Network (ISDN) Q.931 call signaling. Alternatively, if SIP is being used, SIP INVITE messages, including session description protocol (SDP) payloads, are used both to establish media streams during call setup and to modify, add or delete streams in mid-call.

Figure 6:
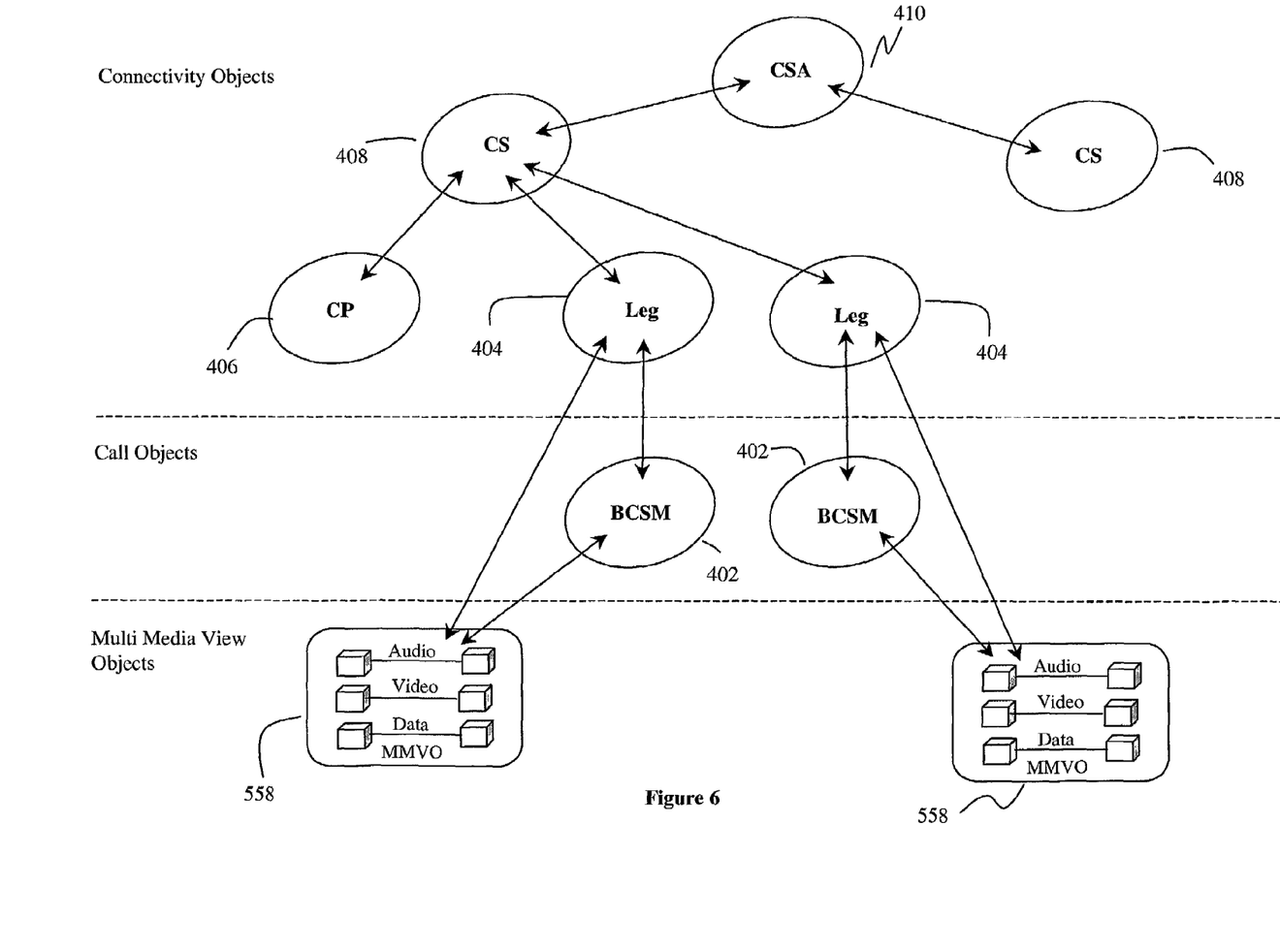
FIG. 6 is a diagram illustrating the relationships between connection view objects and multimedia view objects in accordance with our invention.

The MMV processor 552 includes a MMV service logic processor 554 and a MMV database 556 for storing MMV object attributes. A MMV object 558, depicted in FIG. 6, provides a logical representation of the media streams and terminations associated with a two-party session (or leg) from the viewpoint of an end user involved in the session. A MMV object can be represented as encapsulating the processing and data associated with multimedia streams pertaining to a call. For each logical MMV object, the associated processing is executed by the MMV service logic processor 554. The session data associated with a logical MMV object (e.g., media stream types, bandwidths, and formats) are stored in the MMV database 556. For example, the MMV processor 552, through service logic and bandwidth information stored in the database for the MMV object, may insure that the total allocated bandwidth for the associated session is not exceeded by the addition or modification of individual media streams.

FIG. 6 depicts the enhancements to the connection view (CV) data object architecture and processing performed by the CV processor 544 according to a specific illustrative embodiment of our invention. In the enhanced CV processor 544, MMV objects 558 are associated with the existing CV objects discussed above in reference to FIG. 4. Each of the MMV objects 558 is associated with a particular leg 404 of the session in the CV processor 544 and with the BCSM 402 that controls the leg 404 which is processed by the BCSM processor 542.

The rules for associating an MMV object 558 with a leg 404 are the same as those for associating a BCSM 402 with a leg in traditional AIN processing. Usually, a BCSM is associated with a passive leg of the call. If only a controlling leg exists for the call, the BCSM is associated with the controlling leg, and, when a passive leg is later connected in the "joined" state, the BCSM is moved to the passive leg. Following this rule, an MMV object 558 is associated with a passive leg of the session except when the passive leg is not yet in the "joined" state, such as during setup of the session. For example, in a multiparty (e.g., three-party) call, a separate set of media streams exists for communications with each of the remote parties. In this case, communication with each remote party is represented by a separate MMV object 558.

In a multimedia call, media streams may be created, modified or deleted at various points during the call. For example, such actions may result from end user requests transmitted via call signaling during call setup or teardown, or via call signaling in mid-call. Media streams may also be created, modified or deleted in mid-call via other types of signaling, such as H.245 media control signaling. Our invention adds three new messages and their associated acknowledgement messages (create_MMV, modify_MMV, and delete_MMV) to both the originating and terminating basic call state models for creating, modifying, and deleting MMV objects. In addition, our invention adds two additional messages (modify_streams and modify_reply) and extends existing messages (e.g., answer and alerting messages) for communicating media stream modifications between the originating and terminating BCSM.

Figure 7:
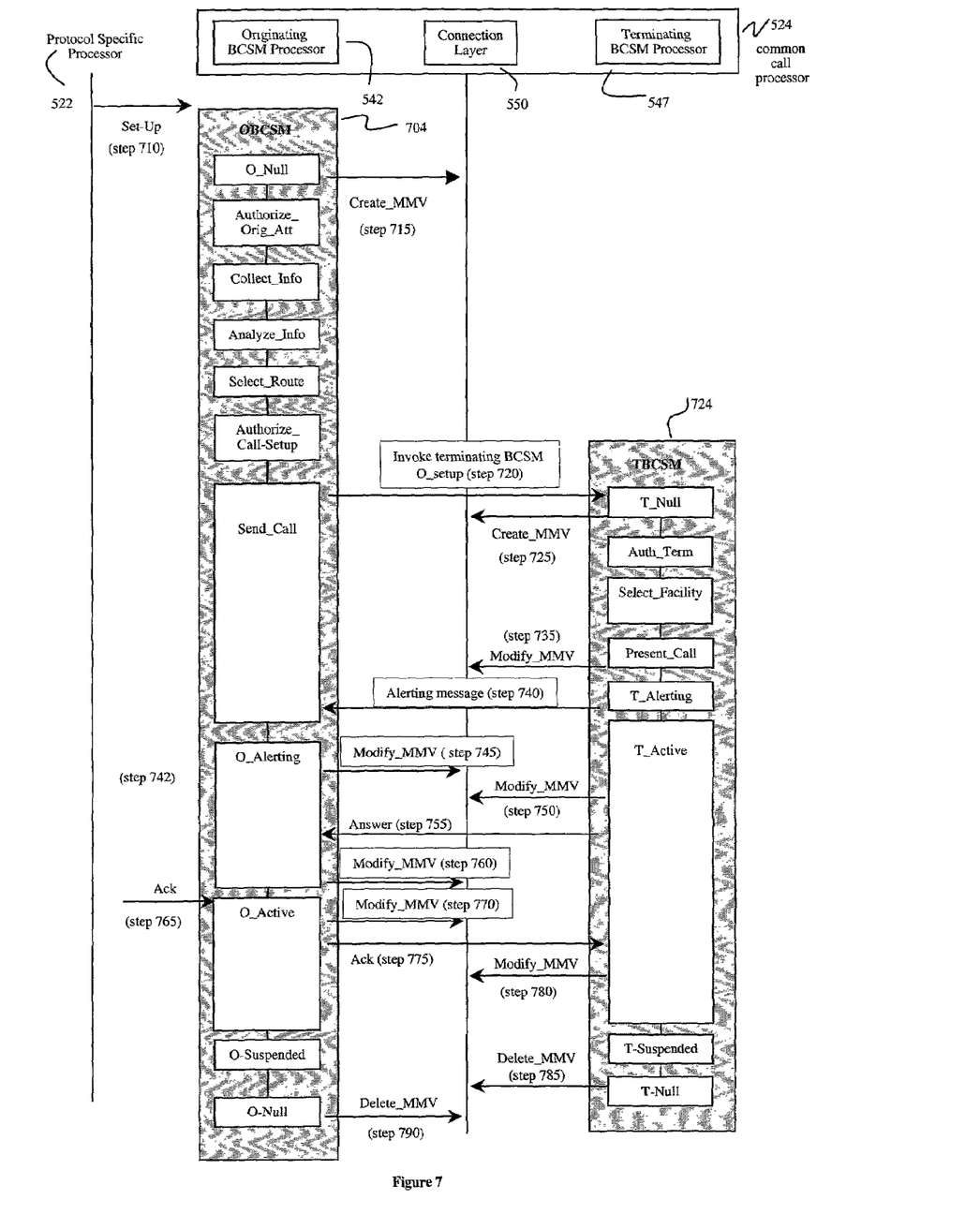
FIG. 7 is a flow diagram illustrating a method for processing multimedia calls in accordance with our invention.

FIG. 7 sets forth an illustrative method of operation in which media streams are created as a result of end-user requests during call setup. In this embodiment, the calling and the called parties are served by the same SM 516 and a single BCSM processor may perform the functions of both the originating BCSM processor 542 and the terminating BCSM processor 547. In an alternate embodiment, the calling and called parties are served by different SMs 516. In the multiple SM embodiment described in association with FIG. 10, call signaling travels through a series of SMs 516 between the two parties. The method as depicted in FIG. 7 begins when the SM 516 receives a call setup request from a customer terminal. The protocol specific processor 522 handles the protocol specific processing of the request and forwards the request to the service layer 540 of the common call processor 524 (step 710). The service layer then invokes originating BCSM processing, depicted in the originating basic call state model (OBCSM) stack 704 in FIG. 7, in the originating BCSM processor 542. The following descriptions assume AIN BCSM implementations. Other types of BCSM also exist (e.g., the ITU-T IN BCSMs) and could be utilized with some differences in detailed operation.

When the setup message is received by the originating BCSM processor 542 during the O_Null point in call, the originating BCSM processor 542 generates a create_MMV message and communicates the message to the connection layer (step 715). If the original call setup request includes media stream information such as proposals for establishment of media streams or media capabilities of the end-user's system, this information is also communicated to the connection layer in the create_MMV message. In response, the MMV processor 554 in connection layer 550 generates a MMV object, attributes and service logic associated with the half-call model (and the connection view) of the originating party and sends an acknowledgement response to the originating BCSM processor 542. An acknowledgement response is generated for every create_MMV, modify_MMV and delete_MMV message and includes media stream information resulting from MMV service logic processing. For simplicity, the acknowledgement messages are not explicitly shown in the Figures.

The originating BCSM processor 542 continues executing the originating BCSM. The original call setup request typically contains the called party address which suggests that there may be no need to collect additional information in the Collect_Info point in call. At step 720 during the Send_Call point in call, the originating BCSM invokes terminating BCSM processing, depicted in FIG. 7 in the terminating basic call state model (TBCSM) stack 724 in the terminating BCSM processor 547.

The terminating BCSM processor 547 then begins executing the terminating BCSM. During the T_Null point in call, the terminating BCSM processor 547 generates a create_MMV message and communicates the message to the connection layer (step 725). If the calling party's setup request includes media stream information, this information is communicated as part of the generalized O_Setup message to the terminating BCSM at step 720 and also communicated to the connection layer in the create_MMV message. In response, the MMV processor 554 generates a MMV object associated with the half-call model (and the connection view) of the terminating party.

After creation at steps 715 and 725, the MMV objects associated with the originating and terminating party can be modified at various points during BCSM processing through the use of a modify_MMV message. A modify_MMV message is generated by the BCSM processor and communicated to the connection layer 550. When the connection layer 550 receives this message, the MMV service logic processor 554 updates the associated MMV object 558 based on the information contained in the modify_MMV message. Thus, at step 735 during the Present_Call point in call of the terminating BCSM, the terminating BCSM processor 547 identifies any elements provided by the terminating user that may modify the media stream information. For example, this could include selections from the media channels proposed by the calling party, new media stream proposals or end-user capabilities (depending on the details of the multimedia protocol and its negotiation and information exchange processes). If these elements are present, the terminating BCSM processor 547 communicates a modify_MMV message to the connection layer 550 to update the MMV object 558 associated with the terminating party Updates to the media stream information may also be transmitted from the terminating BCSM to the originating BCSM in a generalized alerting message (step 740). During the O_Alerting point in call, the originating BCSM processor 542 identifies whether updates are present (step 742). If present, the BCSM processor communicates a modify_MMV message to update the MMV object associated with the originating party.

Information related to media streams may also be provided to the terminating BCSM when the called party accepts the call (e.g., via a connect indication). In response to receiving information from the called party, the terminating BCSM processor 547 communicates a modify_MMV message to update the MMV object associated with the terminating party (step 750). The media information is also transmitted to the originating BCSM in a generalized answer message (step 755). In response to the receipt of media information, the originating BCSM communicates a modify_MMV message to update the MMV object associated with the originating party.

In some multimedia architectures, an additional acknowledgement may be required from the calling party in order to complete a three-way handshake for the call setup. In this case, the acknowledgement (step 765) would arrive during the O_Active point in call. If media stream information is included in the acknowledgement, the BCSM processor generates and communicates a modify_MMV message to update the MMV object associated with the originating party (step 770). The media stream information in the acknowledgement message is also communicated to the terminating BCSM (step 775) during the O_Active point in call. In response to receipt of this information, the terminating BCSM generates and communicates a modify_MMV message to update the MMV object associated with the terminating party (step 780). Additional methods for altering media streams during the O_Active and T_Active points in call are discussed in association with FIG. 8 and FIG. 9.

When BCSM processing is in either the originating active point in call or the terminating active point in call, the call may be released. In this case, both the originating and terminating BCSM processor stacks 704 and 724 generate delete-_MMV messages and communicate these messages to the connection layer (step 785 and step 790). In response, the MMV processor 554 deletes the MMV objects 558 associated with the session.

In an alternate H.323 embodiment, the H.225 protocol is used for call setup and release. Media streams can also be established during call setup if the setup messages include fastStart elements including a sequence of H.245 openLogicalChannel structures and if both parties agree to utilize the fastConnect procedures. If fastConnect is not utilized, then the Setup message from the originating user will lead to creation of a null MMV object in step 715. The media stream information will be furnished after call setup via H.245 protocol procedures.

If H.323 fastConnect is utilized, then the create_MMV messages shown in steps 715 and 725 communicate information on the media streams proposed by the calling party. The called party may respond by choosing the specific media streams (logical channels) desired from the initial list and including the selection in an H.225 response message. For example, if the information is included during an H.225 CallProceding or Alerting message, the MMV objects are updated in steps 735 and 745. If the information is delayed until the H.225 Connect message, the MMV objects are updated in steps 750 and 760. No additional acknowledgement from the calling party is required.

In an alternative SIP embodiment, the setup message from the originating party is an INVITE message which usually contains proposals for media streams. The create_MMV messages in steps 715 and 725 communicate this information to the connection management layer. In SIP, the called party's terminal responds with a 200 OK message to accept the call and return media stream information which is communicated to the connection management layer via modify_MMV messages in steps 750 and 760. A three-way handshake is completed with an acknowledgement message from the calling party's terminal (step 765). The acknowledgement message may also include media stream information which is communicated using modify_MMV messages in steps 770 and 780.

Figure 8:
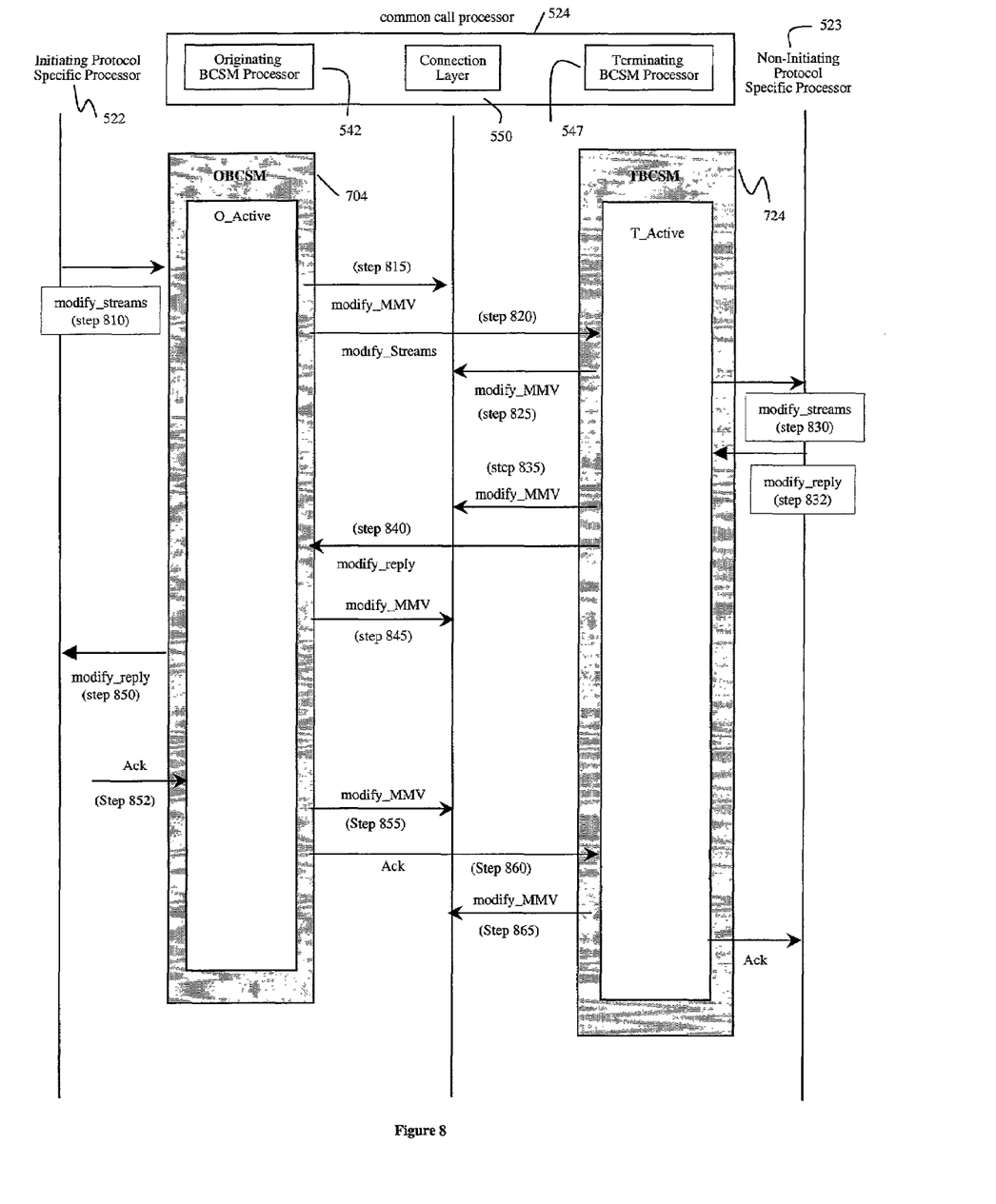
FIG. 8 is a flow diagram illustrating a method for processing modifications to media streams in a stable multimedia call in accordance with our invention.

FIG. 8 depicts a method for creating, modifying or deleting media streams during the O_Active and T_Active points in call of a stable multimedia call according to a specific illustrative embodiment of our invention. In this embodiment, mid-call changes to media streams are requested via call signaling from end users. FIG. 8 illustrates a method where the originating party is the initiating party. Therefore, the BCSM processor associated with the initiating party is the originating BCSM 542. This method begins when the SM 516 receives a request from a customer terminal to modify (create, change or delete) a media stream. The protocol specific processor 522 handles the protocol specific processing of the request and forwards the request to the service layer 540 of the common call processor 524 in a modify_streams message (step 810).

Because MMV objects associated with the half-call models are typically created during call setup (as described above in connection with FIG. 7), the originating BCSM processor 542 associated with the initiating party generates a modify_MMV message and communicates the message to the connection layer (step 815) and also communicates the proposed modification of the media streams to the BCSM processor associated with the non-initiating party (the terminating BCSM processor 547) in a modify_streams message.

On receipt of the modify_streams message, the terminating BCSM processor 547 communicates the proposed information to the connection layer 550 in a modify_MMV message (step 825) and to the protocol specific processor associated with the non-initiating party 523 in a modify_streams message (step 830). In step 832, the non-initiating protocol specific processor 523 communicates to the terminating BCSM processor 547 in a modify_reply message the non-initiating party's response to the proposed modifications. The terminating BCSM processor 547 communicates the negotiated media stream information to the connection layer 550 in a modify_MMV message (step 835) and to the originating BCSM processor 542 in a modify_reply message (step 840). Upon receipt of the modify_reply message, the originating BCSM processor 542 communicates the negotiated media stream information to the connection layer 550 in a modify_MMV message (step 845) and to the initiating protocol specific processor 522 in a modify_reply message (step 850).

Although FIG. 8 illustrates the originating party requesting media stream changes during the O_Active point in call, the terminating party can also request modifications to the media stream during the T_Active point in call. The method is identical to the method described for the originating party except the roles of the originating and terminating parties are reversed.

In an H.323 embodiment, H.245 mid-call requests for changes in the media streams including creation or deletion of new streams are tunnelled inside H.225 call signaling messages (e.g., Facility messages). The modify_MMV messages shown in steps 815 and 825 communicate media stream requests proposed by the initiating party. The response from the non-initiating party to this request (e.g., acceptance or rejection of a proposed logical channel) leads to an update of the MMV objects in steps 835 and 845. No additional acknowledgement is required. Alternatively, in a SIP embodiment, the initiating party sends an INVITE message to the SM 516 including media stream requests. The modify_MMV messages in steps 815 and 825 communicate these media stream requests. The response from non-initiating party leads to an update of the MMV objects in steps 835 and 845. A three-way handshake is completed with an acknowledgement message (step 852). If media stream information is included in the acknowledgement, that information is used to update the MMV objects in steps 855 and 865.

Figure 9:
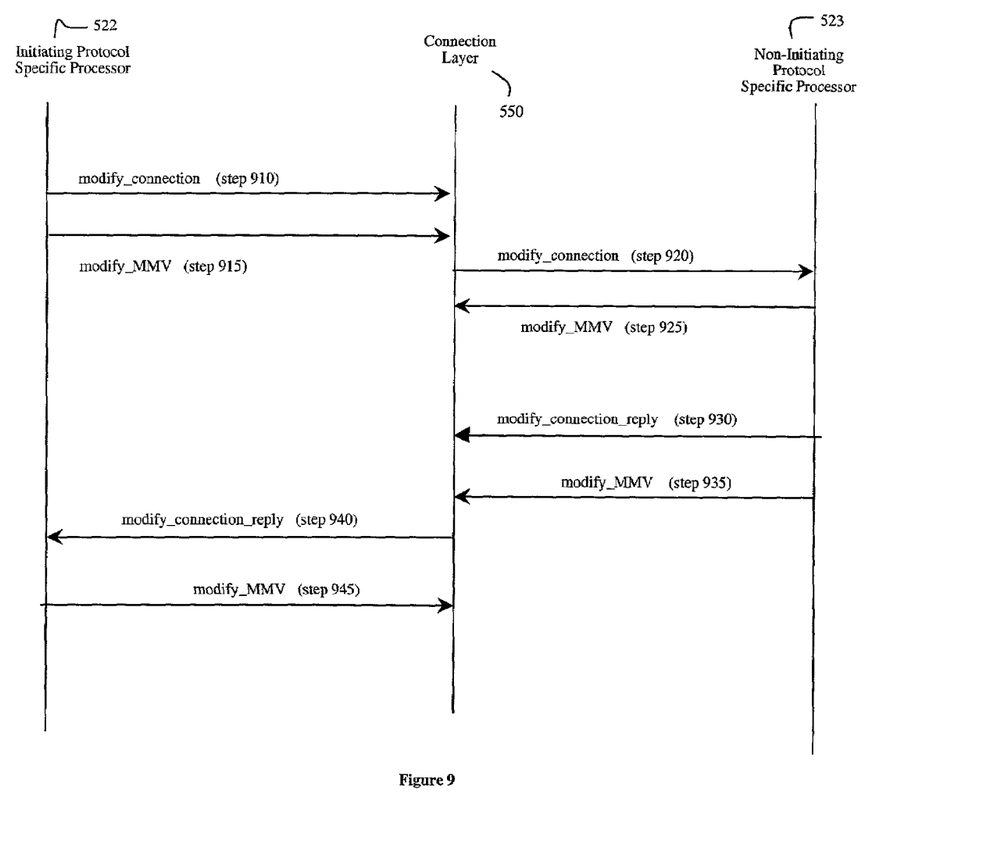
FIG. 9 is a flow diagram illustrating an alternative method for processing modifications to media streams in a stable multimedia call in accordance with our invention.

In an alternate embodiment depicted in FIG. 9, mid-call changes to media streams are requested via connection-control or bearer-control signaling instead of call signaling from end-users. In addition, media stream information can be extracted from call signaling messages generated by the end user. Because this embodiment does not embed media stream requests in call signaling messages between protocol specific processors and BCSMs, the originating BCSM processor 542 and the terminating BCSM processor 547 are not involved in the modification process. For example, in H.323, the protocol specific processor can extract the H.245 messages tunneled within the call signaling messages and transmit the messages directly to the connection layer 550 without involving the BCSMs.

When a modification request is received from an initiating party, the protocol specific processor 522 generates and communicates a modify_connection request to the connection layer 550 (step 910). The party initiating a modification to existing MMV objects can be the originating or terminating party. Modifications in this embodiment may refer to creating or deleting media streams, and modifying the properties of individual streams or combinations of streams.

In step 915, the initiating protocol specific processor 522 also generates and communicates a modify_MMV message to the connection layer 550. In an alternate embodiment, the connection layer 550 generates the modify_MMV. The connection layer 550 communicates the modify_connection message to the non-initiating protocol specific processor 523 (step 920) which communicates the proposed media stream modification in a modify_MMV message to the connection layer 550 (step 925). The response from the non-initiating party to proposed modifications is communicated from the non-initiating protocol specific processor 523 to the connection layer 550 (step 930) and from the connection layer 550 to the initiating protocol specific processor 522 (step 940) in modify_connection_reply messages. In response to the modify_conection_reply messages, the initiating protocol specific processor 522 and the non-initiating protocol specific processor 523 communicate separate modify_MMV messages containing the negotiated media stream information to the connection layer 550.

In an alternate H.323 embodiment, an H.245 control channel is used to open, close or modify logical channels representing media streams. The modify_MMV messages shown in steps 915 and 925 communicate information on the media streams proposed by the party requesting the changes. The response from the other end user to his request (e.g., acceptance or rejection of a proposed logical channel) leads to an update of the MMV objects in steps 935 and 945. As discussed earlier, MMV processing does not necessarily need to accept end user requests or transmit them transparently. For example, if a media stream is requested which would exceed the allotted bandwidth for the call or violate policies for an end user, the MMV processor 554 may cause the connection layer to generate a rejection message to the requesting party or filter the information rather than passing on the original information to the other party.

The MMV processing executed by the MMV processor 552 in the connection layer 550 when a message is received can be passive and simply record the media stream choices negotiated by the end users. In this embodiment, the information contained in the messages from a BCSM processor or protocol specific processor is transparently communicated by the connection layer 550 to the recipient BCSM processor or protocol specific processor. Alternatively, the processing at the MMV processor 552 can be non-transparent. The MMV processor 552 through its service logic can actively filter or alter information (e.g., to eliminate particular proposals for types of media streams not supported by the network or by the end user's access network or service subscription) communicated by a BCSM. In addition, the MMV processor 552 may cause the connection layer to communicate a message to the requesting BCSM processor or protocol specific processor rejecting the media stream request. MMV processing can also communicate messages to end users to alter the normal flow of media stream negotiations.

Figure 10:
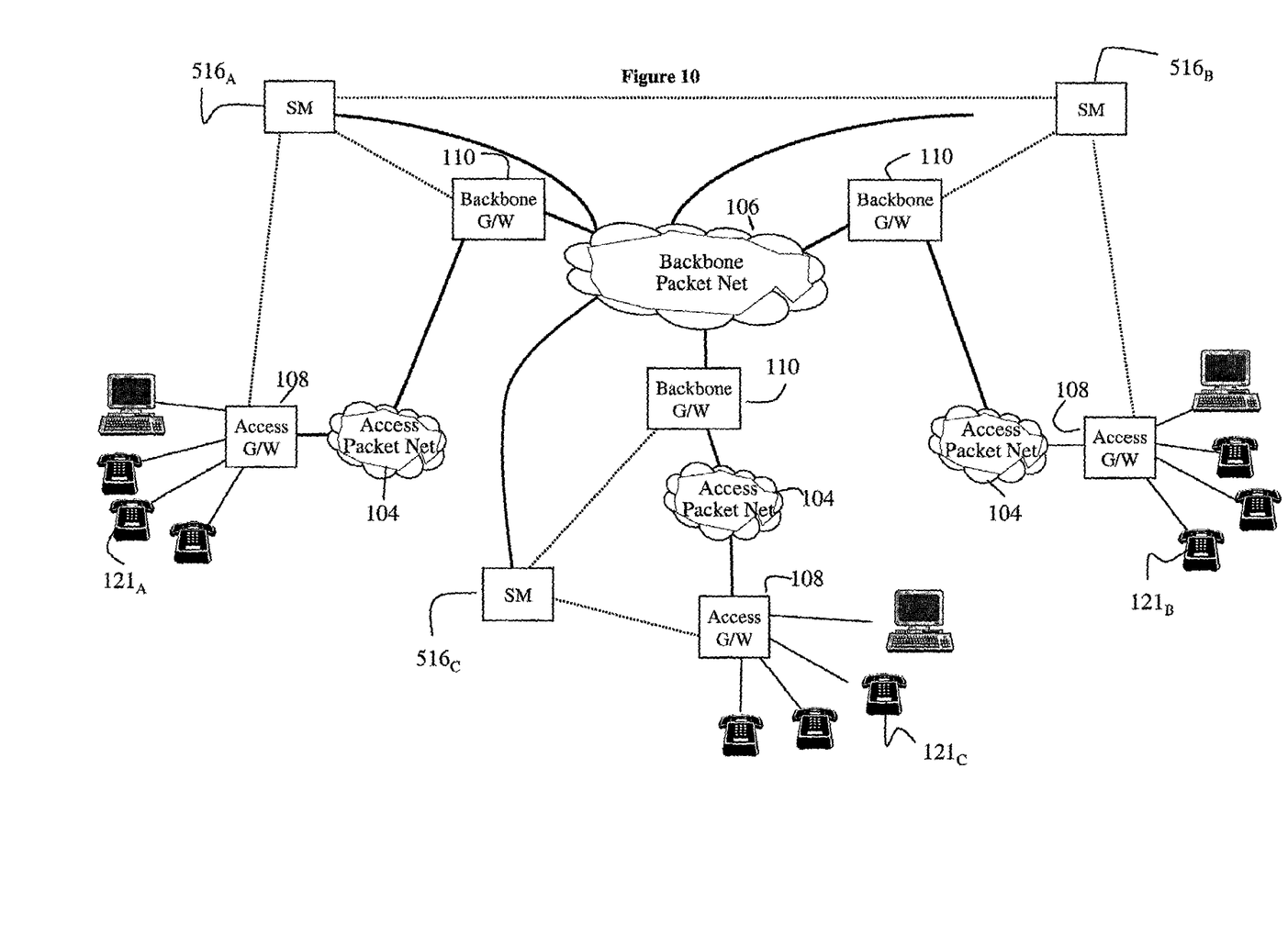
FIG. 10 is a network diagram illustrating a packet-based network wherein multiple parties to a multimedia call are served by different service managers.

In an alternate embodiment of our invention, depicted in FIG. 10, multiple parties are served by different SMs 516. This embodiment can support two-party calls and multiparty calls. FIG. 10 illustrates a basic three party call with party A 121$_A$ as call originator, party B 121$_B$ as the terminating party, and party C 121$_C$ as the third party. The initial two-party call between party A and party B is established using the method described above for FIG. 7 except the originating basic call state model (OBCSM) stack 704 is executed by the SM 516$_A$ serving party A and the terminating basic call state model (TBCSM) stack 724 is executed by the SM 516$_B$ serving party B. The two SMs exchange the messages discussed in accordance with FIGS. 7–9 via a packet data communications network. As in current PSTN switches, each SM 516 within the call signaling path would typically execute both an originating and a terminating BCSM. FIG. 7 shows only the two BCSMs in the SM closest to the calling and called parties and does not explicitly indicate intermediate BCSMs or their associated MMV objects.

Several methods exist for adding a third party to an existing call. For example, when party A adds party C to the call, party A may communicate a message to the SM 516$_C$ serving party C indicating that party C also needs to invite party B. In a SIP implementation, this communication is accomplished by including an "also" header in the SIP INVITE message from party A to party C. Party C then communicates a request to its SM 516$_C$ for call setup to party B.

The method described above for FIG. 7 is followed for the second two-party connection between party A and party C except that the OBCSM stack 704 is executed by the SM 516$_A$ serving party A and the TBCSM stack 724 is executed by the SM 516$_C$ serving party C. Similarly, the method described above for FIG. 7 is followed for the third two-party connection between party C and party B except that the OBCSM stack 704 is executed by the SM 516$_C$ serving party C and the TBCSM 724 is executed by the 516$_B$ serving party B.

When the three-way call setup has been completed, each of the SMs serving the parties contains a connection view description of the three-way call from the viewpoint of its associated end-user. For example, the SM 516$_A$ serving party A contains a CSA with a controlling leg representing party A and two outgoing legs. Each outgoing leg is associated with a BCSM and a MMV object which describes the media stream connections to one of the other two parties (B or C).

Although the invention has been shown and described with respect to exemplary embodiments thereof, it should be understood by those skilled in the art that various changes, omissions and additions may be therein and thereto, without departing from the spirit and scope of the invention.

What is claimed is:

1. A method for processing multimedia calls in at least one service manager wherein the at least one service manager comprises a BCSM processor for executing originating and terminating call models and a means for connection management, the method comprising the steps of:

in response to a call setup request from an originating party, invoking originating BCSM processing in the BCSM processor of the service manager associated with the originating party;

generating a first message in the BCSM processor of the service manager associated with the originating party to create a multimedia view object associated with the originating party and communicating the first message to the means for connection management of the service manager associated with the originating party;

invoking terminating BCSM processing in the BCSM processor of the service manager associated with a terminating party;

generating a second message in the BCSM processor of the service manager associated with the terminating party to create a multimedia view object associated with the terminating party and communicating the second message to the means for connection management of the service manager associated with the terminating party;

in response to an update to media streams initiated by the terminating party, generating a third message in the BCSM processor of the service manager associated with the terminating party to modify the multimedia view object associated with the terminating party and communicating the third message to the means for connection management of the service manager associated with the terminating party;

in response to an update to media streams initiated by the originating party, generating a fourth message in the BCSM processor of the service manager associated with the originating party to modify the multimedia view object associated with the originating party and communicating the fourth message to the means for connection management of the service manager associated with the originating party;

in response to a release of the call, generating a fifth message in the BCSM processor of the service manager associated with a party initiating the release to delete the multimedia view object associated with the initiating party and communicating the fifth message to the means for connection management of the service manager associated with the initiating party; and in response to a release of the call, generating a sixth message in the BCSM processor of the service manager associated with a non-initiating party to delete the multimedia view object associated with the non-initiating party and communicating the sixth message to the means for connection management of the service manager associated with the non-initiating party.

2. The method in accordance with claim 1 wherein the service manager associated with the originating party and the service manager associated with the terminating party are the same service manager.

3. The method in accordance with claim 1 wherein a first service manager is associated with the originating party and a second service manager is associated with the terminating party.

4. The method in accordance with claim 1 wherein the multimedia view object comprises multimedia view attributes and multimedia view service logic.

5. The method in accordance with claim 1 wherein the update contained in the third message to media streams initiated by the terminating party comprises information provided by the terminating party during a point in terminating BCSM processing where the call is presented to the terminating party.

6. The method in accordance with claim 1 wherein the update contained in the third message to media streams initiated by the terminating party comprises information provided by the terminating party when accepting the session.

7. The method in accordance with claim 1 wherein the update contained in the fourth message to media streams initiated by the originating party comprises information provided to the BCSM processor executing the originating basic call state model from the BCSM processor executing the terminating BCSM in an alerting message.

8. The method in accordance with claim 1 wherein the update contained in the fourth message to media streams initiated by the originating party comprises information provided to the BCSM processor executing the originating BCSM from the BCSM processor executing the terminating BCSM in an answer message.

9. The method in accordance with claim 1 wherein the update contained in the fourth message to media streams initiated by the originating party comprises information provided by the originating party in an acknowledgement message during an active point in call.

10. The method in accordance with claim 1 wherein the update contained in the third message to media streams initiated by the terminating party comprises information provided by the originating BCSM in an acknowledgement message during an active point in call.

11. The method in accordance with claim 1 wherein a multimedia view processor in the means for connection management filters the information contained in updates to media streams associated with the originating and terminating parties.

12. The method in accordance with claim 11 wherein the multimedia view processor in the means for connection management generates information to update media streams associated with originating and terminating parties.

13. The method in accordance with claim 12 wherein the multimedia view processor in the means for connection management communicates a rejection to an update request.

14. The method in accordance with claim 1 wherein each BCSM processor is an AIN BCSM processor.

15. The method in accordance with claim 1 wherein each BCSM processor is an ITU-T BCSM processor.

16. The method in accordance with claim 1 wherein the call setup request from the originating party uses H.225 protocol.

17. The method in accordance with claim 1 wherein the call setup request from the originating party uses SIP protocol.

18. A method for processing modifications to media streams of a stable multimedia call during the active point in call of the originating and terminating basic call state model in the at least one service manager wherein at least one service manager comprises a BCSM processor arid a means for connection management, the method comprising the steps of:

in response to a modification request communicated by a protocol specific processor of the service manager associated with an initiating party, performing in the BCSM processor of the service manager associated with the initiating party the steps of:
generating a first message to modify the multimedia view object associated with the initiating party and communicating the first message to the means for connectIon management of the service manager associated with the initiating party; and
generating a second message containing the proposed modifications and communicating the second message to the BCSM processor of the service manager associated with a non-initiating party;

in response to the proposed modifications communicated by the BCSM processor of the service manager associated with the initiating party, performing in the BCSM processor of the service manager associated with the non-initiating party the steps of:
generating a third message to modify the multimedia view object associated with the non-initiating party and communicating the third message to the means for connection management of the service manager associated with the non-initiating party; and
generating a fourth message containing the proposed modifications and communicating the fourth message to a protocol specific processor associated with the non-initiating party;

in response to a reply to the proposed modification communicated by the protocol specific processor associated with the non-initiating party, performing in the BCSM processor of the service manager associated with the non-initiating party the steps of:
generating a fifth message to modify the multimedia view object associated with the non-initiating party and communicating the fifth message to the means for connection management of the service manager associated with the non-initiating party; and
generating a sixth message containing the reply to the proposed modification and communicating the sixth message to the BCSM processor of the service manager associated with the initiating party;

in response to the reply to the proposed modifications communicated by the BCSM processor of the service manager associated with the non-initiating party, performing in the BCSM processor of the service manager associated with the initiating party the steps of:

generating a seventh message to modify the multimedia view object associated with the initiating party and communicating the seventh message to the means for connection management of the service manager associated with the initiating party; and generating a eighth message containing the reply to the proposed modifications and communicating the eighth message to a protocol specific processor of the service manager associated with the initiating party;

in response to a reply generated by the protocol specific processor of the service manager associated with the initiating party, generating an ninth message to modify the multimedia view object associated with the initiating party arid communicating the ninth message to the means for connection management of the service manager associated with the initiating party; and generating a tenth message containing an acknowledgement of the agreed upon modifications and communicating the tenth message to the BCSM processor of the service manager associated with the non-initiating party; and in response to the message containing an acknowledgement of the agreed upon modifications, generating an eleventh message in the BCSM processor of the service manager associated with the non-initiating party to modify the multimedia view object associated with the non-initiating party and communicating the eleventh message to the means for connection management associated with the non-Initiating party.

19. The method in accordance with claim 18 wherein the service manager associated with the initiating party and the service manager associated with the non-initiating party are the same service manager.

20. The method in accordance with claim 18 wherein a first service manager is associated with the initiating party and a second service manager is associated with the non-initiating party.

21. The method in accordance with claim 18 wherein a multimedia view processor in the means for connection management filters the information contained in updates to media streams associated with the originating and terminating parties.

22. The method in accordance with claim 21 wherein the multimedia view processor in the means for connection management generates information to update media streams associated with originating and terminating parties.

23. The method in accordance with claim 22 wherein the multimedia view processor in the means for connection management communicates a rejection to an update request.

24. A method for processing modifications to the media streams of a stable multimedia call through connection control signaling, bearer-control signaling, or extraction of information from call signaling messages in at least one service manager wherein each service manager comprises a protocol specific processor and a means for connection management:

in response to a modification request related to media streams associated with the party initiating the modification, performing in a protocol specific processor of a service manager associated with the initiating party the steps of:

generating a first message to modify the multimedia view object associated with the initiating party and communicating the first message to the means for connection management of the service manager associated with the initiating party; and generating a second message containing the proposed modifications to the media streams and communicating the second message to the protocol specific processor of the service manager associated with the non-initiating party via the means for connection management;

in response to a modification request related to media streams associated with the non-initiating party, performing in a protocol specific processor of the service manager associated with the non-initiating party the steps of:

generating a third message containing a response to the proposed modification to the media streams and communicating the third message to the protocol specific processor of the service manager associated with the initiating party via the means for connection management; and generating a fourth message to modify the multimedia view object associated with the non-initiating party and communicating the fourth message to the means for connection management of the service manager associated with the non-initiating party; and in response to the message from the protocol specific processor of the service manager associated with the non-initiating party containing the response to the proposed modification, generating a fifth message in the protocol specific processor of the service manager associated with the initiating party to modify the multimedia view object associated with the initiating party and communicating the fifth message to the means for connection management of the service manager associated with the initiating party.

25. The method in accordance with claim 24 wherein the service manager associated with the initiating party and the service manager associated with the non-initiating party are the same service manager.

26. The method in accordance with claim 24 wherein a first service manager is associated with the initiating party and a second service manager is associated with the non-initiating party.

27. The method in accordance with claim 24 wherein the initiating party is an originating patty of the multimedia call.

28. The method in accordance with claim 24 wherein the initiating party is a terminating party of the multimedia call.

29. The method in accordance with claim 24 wherein a multimedia view processor in the means for connection management filters the information contained in updates to media streams associated with the originating and terminating parties.

30. The method in accordance with claim 29 wherein the multimedia view processor in the means for connection management generates information to update media streams associated with originating and terminating parties.

31. The method in accordance with claim 30 wherein the multimedia view processor in the means for connection management communicates a rejection to an update request.

* * * * *